United States Patent [19]

Hauber et al.

[11] Patent Number: 5,631,622

[45] Date of Patent: May 20, 1997

[54] STRAIN GAGE AND MEASURING TRANSDUCER AND METHOD OF PRODUCING THE SAME

[75] Inventors: Martin Hauber, Nieder-Beerbach; Helmut Burfeindt, Rossdorf, both of Germany

[73] Assignee: Hottinger Baldwin Messtechnik GmbH, Darmstadt, Germany

[21] Appl. No.: 388,587

[22] Filed: Feb. 14, 1995

[30] Foreign Application Priority Data

Feb. 15, 1994 [DE] Germany ............... 44 04 716.9

[51] Int. Cl.$^6$ ............................................. G01D 5/16
[52] U.S. Cl. ............... 338/2; 428/457; 428/458; 428/460; 33/DIG. 13
[58] Field of Search ............... 428/457, 458, 428/460, 688, 689; 33/DIG. 13; 338/2; 156/233, 247, 249, 235, 298, 335

[56] References Cited

U.S. PATENT DOCUMENTS

| 2,363,181 | 11/1944 | Howland | 201/63 |
|---|---|---|---|
| 3,274,528 | 9/1966 | Bermann | 338/2 |
| 3,315,200 | 4/1967 | Hannay | 338/2 |
| 4,557,150 | 12/1985 | Utsunomiya | 73/862.65 |
| 4,917,940 | 4/1990 | Hopson, Jr. et al. | 428/216 |

FOREIGN PATENT DOCUMENTS

| 0096156 | 12/1983 | European Pat. Off. . |
|---|---|---|
| 0357200 | 3/1990 | European Pat. Off. . |
| 0415576 | 3/1991 | European Pat. Off. . |
| 0460249 | 12/1991 | European Pat. Off. . |
| 0469323 | 2/1992 | European Pat. Off. . |
| 2351810 | 4/1975 | Germany . |
| 2614775 | 10/1977 | Germany . |
| 2741055 | 3/1978 | Germany . |
| 2728916 | 1/1979 | Germany . |
| 2902242 | 7/1980 | Germany . |
| 3043890 | 6/1982 | Germany . |
| 3707077 | 9/1987 | Germany . |
| 4024128 | 2/1992 | Germany . |
| 347556 | 8/1972 | U.S.S.R. . |
| 518617 | 6/1976 | U.S.S.R. . |
| 1249315 | 8/1986 | U.S.S.R. . |
| 1532807 | 12/1989 | U.S.S.R. . |
| 1582035 | 7/1990 | U.S.S.R. . |

OTHER PUBLICATIONS

Philips industrie elektronik; Drehmomentmessstelle; ES 173 63; Jun. 1967.

Primary Examiner—Archene Turner
Attorney, Agent, or Firm—W. G. Fasse; W. F. Fasse

[57] ABSTRACT

A strain gage includes, in stacked order, a backing film (1), a measuring resistor grid (2), and a cover (16) including a first layer (6) of an insulating material and a second layer (7) of a metallic material. At least the metallic second layer (7) of the cover is a metallic foil having a size or extension in the plane of the cover that is smaller than or equal to the size or extension of the backing film (1). The strain gage is simple to manufacture in a continuous strip or large sheet process, and is relatively insensitive to the effects of moisture or changes in humidity.

22 Claims, 3 Drawing Sheets

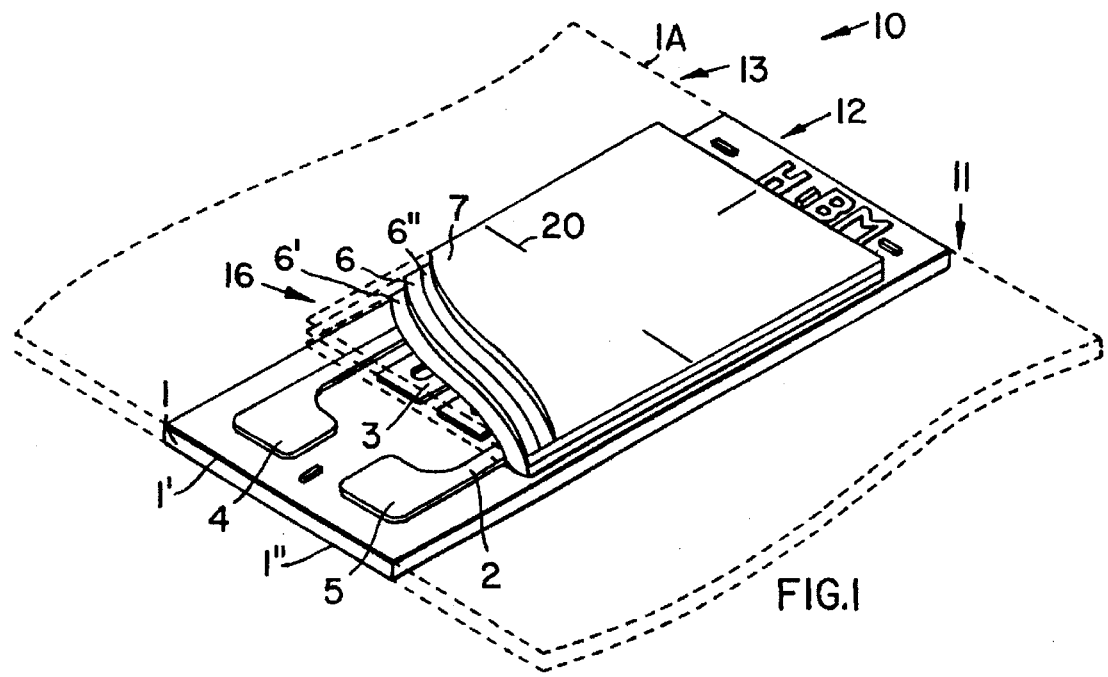
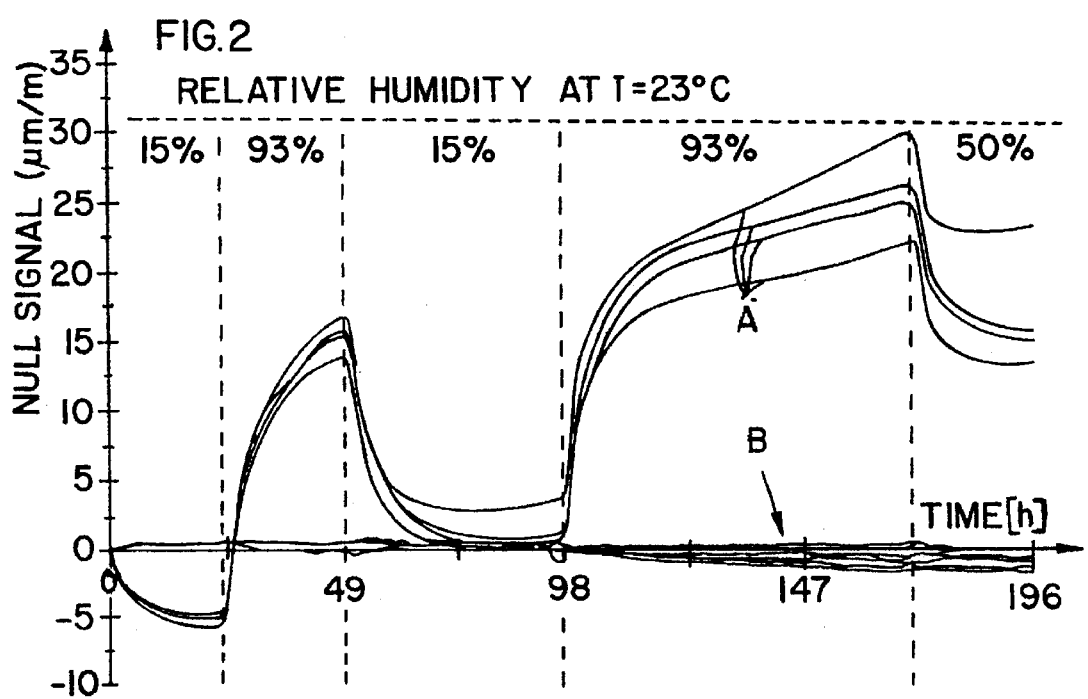

STRAIN GAGE AND MEASURING TRANSDUCER AND METHOD OF PRODUCING THE SAME

FIELD OF THE INVENTION

The invention relates to a foil-type strain gage having a measuring resistor grid arranged on a backing film and covered by a cover including a first layer of an insulating material and a second layer of a metallic material, and to a measuring transducer using such strain gages. The invention further relates to a method of producing such strain gages.

BACKGROUND INFORMATION

Strain gages must generally be protected against the penetration of moisture, to avoid undesirable influences on the measurement signal being caused by humidity or other environmental dampness. Conventional strain gages, per se, are ordinarily not sufficiently protected against moisture. To achieve the necessary protection, the strain gages are first mounted on a measuring transducer or on some other component of which the strain is to be measured, and are then either coated with a moisture-protective layer or are completely encapsulated by a bellows arrangement, for example.

German Patent Laying-Open Document 2,728,916 discloses a typical conventional strain gage of the above described general type. The strain gage is mounted on a measuring transducer and is then coated with an electrically insulating coating layer, for example, a resin layer. The insulating layer is applied in such a manner that it extends beyond the edges of the strain gage device and thus also coats a portion of the transducer member around the edges of the strain gage. A metal layer is then applied onto the insulating layer and similarly overlaps and covers a portion of the transducer all around the edges of the strain gage. The electrical contacts of the strain gage extend under this encapsulating cover through the interior of the transducer and pass to the outside in a sealed manner.

Thus, according to German Patent Laying-Open Document 2,728,916, the moisture-tight hermetic encapsulation is not interrupted or broken at any location. However, this manner of encapsulating or coating the strain gage can only be used for strain gages that have already been mounted on a transducer or other component of which the strain is to be measured. Moreover, the conventional manner of encapsulating or covering the strain gage necessitates additional work steps to be carried out after applying the strain gage onto a component, which slows down final assembly and mounting, and which can lead to poor encapsulation results if the final covering step is carried out under adverse conditions in a field installation.

European Patent Laying-Open Document 0,107,966 and corresponding U.S. Pat. No. 4,557,150 (Utsunomiya) disclose a strain gage having a foil- or film-type covering including an insulating layer and an aluminum layer. Similarly as described above, the disclosed covering extends beyond the strain gage and thus covers a portion of the transducer all around the edges of the strain gage. According to one embodiment of U.S. Pat. No. 4,557,150, in order to achieve a hermetic encapsulation and thereby prevent the penetration of moisture along the perimeter edges of the foil- or film-type covering, an aluminum layer is deposited along the perimeter edges of the covering. Thus, the disclosed manner of covering or encapsulating a strain gage can only be used for strain gages that have already been applied onto a transducer member, such as a load cell.

European Patent Laying-Open Document 0,460,249 discloses a strain gage having a metallic frame surrounding the resistor grid together with its electrical contacts. The space within the frame is filled with an insulating material and is covered by a metal foil that is attached to the frame. This known method of encapsulation is relatively complicated and thus cost intensive due to the number of complicated operations required to form the encapsulation.

U.S. Pat. No. 3,274,528 (Bermann) discloses a strain gage in which the measuring resistor grid is completely embedded in a so-called adhesive matrix comprising a polymerizable base material. A continuous process is used to manufacture a strip of a plurality of the strain gages interconnected to one another in a row along the strip. The individual strain gages are separated from one another before they are applied onto a component. Once a strain gage has been applied onto the component, no further covering or encapsulating is carried out. However, only a limited protection against the penetration of moisture is achieved, because the encapsulation is provided solely by embedding the resistor grid within the synthetic matrix. A complete satisfactory protection against moisture penetration is not achieved because a metallic covering layer is not provided over the embedded strain gage. Thus, the penetration of moisture can still influence the measurement results.

U.S. Pat. No. 3,315,200 (Hannay) discloses a strain gage including a resistor grid sandwiched with adhesive between the oxide covered inner surfaces of two metal foils. Each of the metal foils is first prepared by forming a non-conducting film such as an oxide layer on the surface of the metal foil that will face inwardly. Then, an adhesive layer is applied on the oxide films. The resistor grid is formed on a backing film, and then pressed against one of the adhesive layers. Thereafter the backing film is stripped off and the adhesive layer applied to the second metal foil is pressed against the back side of the resistor grid. Thus, the finished strain gage does not include a resistor grid on a backing film, but rather has a naked resistor grid sandwiched between adhesive layers and outer covering metal foils.

Several disadvantages can exist in the prior art strain gage according to U.S. Pat. No. 3,315,200. For example, the resistor grid can be damaged when stripping off the backing film. Furthermore, because the two outer metal foils forming the cover layers are apparently individually precut to size and then pressed together to form the finished sandwich, misalignments of the edges of the several layers can occur. Moreover, this prior art does not address the problem of moisture penetration and is not directly concerned with such a problem. Instead, the reference is directed to a strain gage that is to be attached to a component having a high fluctuating temperature, for which the problems of moisture penetration are generally known to be less important.

OBJECTS OF THE INVENTION

In view of the above it is the aim of the invention to achieve the following objects singly or in combination:

- to provide a strain gage that is resistant and non-sensitive to the penetration of moisture, that can be simply and cost effectively manufactured, and that requires no subsequent handling after it is applied to a component;
- to provide a metal foil as a covering or encapsulating layer on a strain gage during its manufacture and before the strain gage is finally mounted or applied onto a transducer or component of which the strain is to be measured;
- to provide a strain gage and a measuring transducer that does not have a complete hermetic encapsulation, but that nevertheless achieves a reduced temperature dependence of creep with good linearity of the temperature dependence, and a considerably improved linearity of the temperature coefficient of the zero point, as well as other improved characteristics;

to provide a strain gage that is mechanically robust and reduces the danger of breakage or damage during production and handling of the strain gage, including application of the strain gage onto a component; and to provide a mass-production method for efficiently manufacturing such strain gages, wherein respective film layers can be laminated together to form a continuous strip or sheet of a plurality of strain gages, to which a cover layer including a metal film is applied before the individual strain gages are separated from one another.

SUMMARY OF THE INVENTION

The above objects have been achieved in a strain gage according to the present invention, which comprises a measuring resistor grid arranged on a backing film and a cover applied over the resistor grid. The cover includes a first layer of an insulating material and a second layer of a metallic material. At least the second layer, namely the metallic layer of the cover, is embodied as a foil having an extension or size in the plane of the cover that is less than or equal to the corresponding extension or size of the backing film. Thus, at least the metallic second layer of the cover does not extend beyond the edges of the backing film so as to overlap onto the component or transducer onto which the strain gage is applied.

Such a strain gage can be manufactured according to the method of the invention, wherein a plurality of measuring resistor grids are formed on a backing film, which is in the form of a continuous strip or in sheet form, for example. Then, a first layer comprising an insulating material is applied onto the resistor grids and at least portions of the backing film. Next, a metallic second layer in the form of a metallic foil is applied onto the insulating first layer. Finally, a separating step is carried out to separate preferably single strain gages from the continuous strip or large sheet.

In the strain gage according to the invention, a metal foil is used as an additional cover layer on top of the insulating layer. More particularly, the metal foil layer is applied onto the insulating layer before the individual strain gages are separated from the strip of strain gages being formed. In this manner, even after the separating process, the individual strain gages are each protected against the penetration of moisture at least on their large surfaces.

Contrary to the general wisdom in this field, the metal foils do not provide a complete hermetic encapsulation, for example because the cut edges of the metal foil layer are not sealed to the backing film or the transducer member. Thus, it is an unexpected and surprising result that the strain gages according to the invention achieve a reduced and linear temperature dependence of creep. Furthermore, a considerable improvement is achieved in the linearity of the temperature coefficient of the zero point, as well as in the temperature dependence of the zero return and the Hysteresis error. The temperature dependent scattering of the Hysteresis error can be reduced by a factor of five according to the invention, and the temperature dependent scattering of the zero return is now only half as large.

Moreover, the Hysteresis error can easily be shifted or displaced according to the invention in order to improve the transducer output data. For example, by appropriately selecting the structure of the strain gage, it is possible to achieve a more-positive or more-negative Hysteresis error. In other words, the Hysteresis error will lie above or below the characteristic loading curve. The variation of the measurement signal due to moisture variations in the surrounding atmosphere is now practically insignificant so that an improvement of the long term stability of the measurement characteristics, which furthermore have a very small scattering, can be achieved. The use of foils or films for the various layers of the strain gages assures a very small deviation in the thickness of the gages, which is another factor contributing to the improvement of the measuring characteristics.

A further advantage of the cover layer including a metal foil is that it greatly reduces the danger of breakage and other damage during fabrication and handling of the strain gages. The composite film comprising the backing film and the metallic cover foil has a substantially improved strength and stability, which especially contributes to preventing the breaking, chipping, or splintering of the entire strain gage or the corners and edges thereof while separating the individual strain gages from the strip or sheet including a plurality of strain gages connected to one another. The increased mechanical stability of the present inventive strain gages allows the production method to be carried out automatically and also allows all subsequent handling to be carried out in a faster, easier, more efficient and problem-free manner.

A further advantage according to the invention is that various markings, such as an identifying name of the manufacturer, electrical characteristics, circuitry information and orientation markings, can be applied to the metallic covering foil, for example by laser marking, etching, or printing on the foil or by other means. The usual marking to indicate the center of the measuring resistor grid by marks applied beside the cover a prescribed distance from the center of the grid, can be replaced or supplemented by center marks applied onto the metallic covering foil at the actual grid center as described above.

In an advantageous embodiment, an intermediate layer is arranged between the insulating first layer and the metallic second layer of the cover material, whereby the intermediate layer preferably comprises an adhesive material. The adhesion of the metal foil to the insulating film can be further improved by means of chemical, electrochemical or mechanical treatments such as surface roughening. Further according to the invention, an additional protective layer can be arranged on the metallic second layer of the cover to protect the metallic foil from mechanical damage or chemical attack, for example.

A particularly simple and advantageous manner of fabricating the strain gages is achieved when the metallic second layer of the cover and the backing film comprise two common cut-off edges, i.e. edges that are each formed by a single common cut through both the metallic second layer and the backing film. For example, a band or strip of the backing film with the individual strain gages thereon can be fabricated in a continuous process. After the individual strain gages are covered with the cover material, which may also be a continuous strip, the individual strain gages are separated, for example, by being cut-off from the continuous strip. In this manner, each finished strain gage will have two edges formed by the cut-off planes, along which the strain gages are cut from the continuously produced strip.

Alternatively, the fabrication can be carried out using large area sheets, whereby a plurality of strain gages is fabricated in rows and columns over the surface of a large sheet of backing film, for example. In such a large sheet process, the separating step, such as a cut-off step, will form several common cut-off edges of the backing film and the cover layer for each finished strain gage.

The fabrication process can be considerably simplified by forming each of the layers of the strain gages by a respective film or foil. The several films and foils are laminated together to form a single continuous composite film strip, which is then cut to form the individual strain gages. Each finished strain gage is thus a composite film component, including the backing film, the resistor grid formed thereof, and the insulating layer and metallic layer of the cover applied thereon.

The measurement characteristics of the finished strain gages can be influenced or adjusted as desired by appropriately adapting or altering the type and arrangement of the cover layers. It is especially simple to influence the measuring characteristics of measuring transducers, such as load cells, pressure sensors and the like, that use several strain gages, by appropriately combining different strain gages according to the invention having different types and extents of covering applied thereto. Such transducers can use a combination of strain gages including ones that are completely covered except for the areas of the electrical contacts and/or ones that are covered only over a portion of their surface area. The easy selectability of measuring characteristics is, of course, also true regarding transducers of which all the strain gages are completely covered or of which all the strain gages are only partially covered.

BRIEF DESCRIPTION OF THE DRAWINGS

In order that the invention may be clearly understood, it will now be described, by way of example, with reference to the accompanying drawings, wherein:

FIG. 1 is a perspective view of a representative strain gage according to the invention, with a continuous strip of several strain gages being manufactured shown by dashed lines;

FIG. 2 is a graph showing the variation of the zero signal of a group B of strain gages according to the invention and a group A of comparative strain gages, as the ambient relative humidity is altered over time, to demonstrate the moisture sensitivity;

Figure 3:
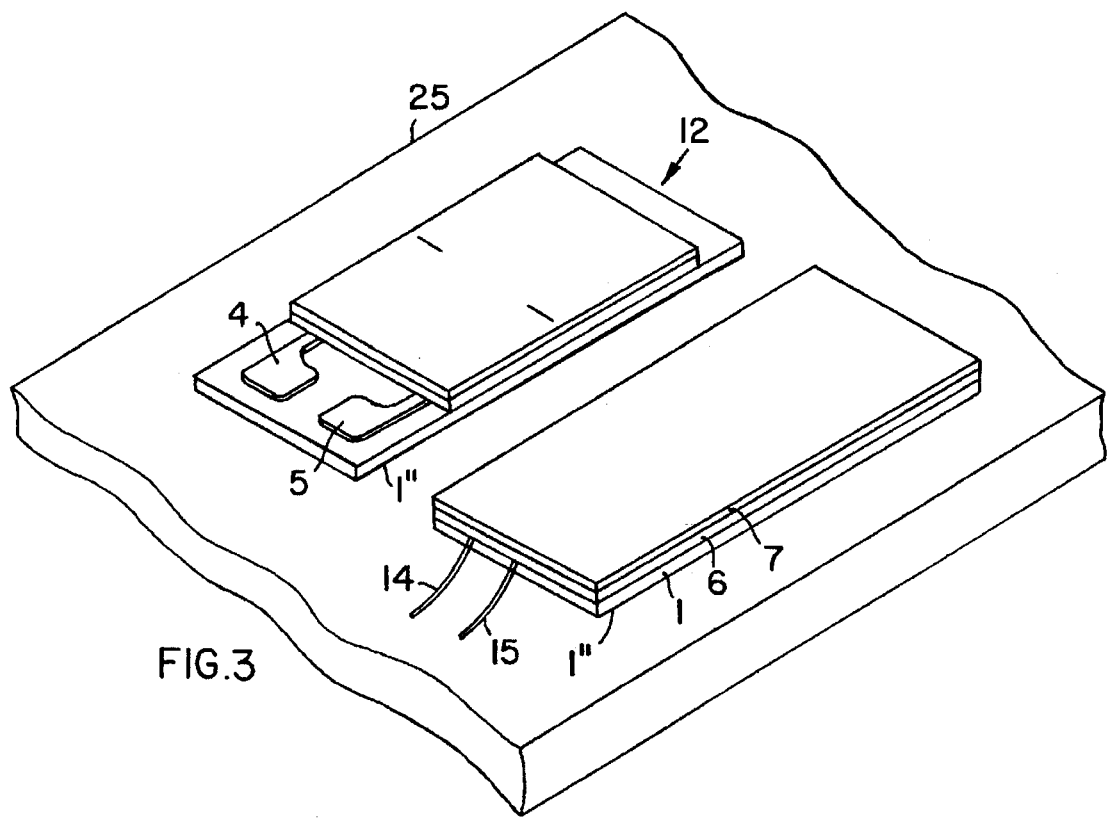
FIG. 3 shows a representative strain gage according to the invention mounted on a measuring transducer such as a load cell member.

DETAILED DESCRIPTION OF PREFERRED EXAMPLE EMBODIMENTS AND OF THE BEST MODE OF THE INVENTION

FIG. 1 shows a strain gage 12 as it is formed in a substantially continuous strip 10, that includes a plurality of consecutive strain gages, for example strain gages 11, 12, and 13. Strain gage 11 precedes, and strain gage 13 follows, the strain gage 12 that will be discussed herein. Each of the strain gages has the same structure, for example. Strain gages 11 and 13 are shown simply by dashed lines for the sake of clarity and to represent the state of gage 12 after the individual strain gages have been cut or otherwise separated from the continuous strip 10.

The representative strain gage 12 includes a backing film 1, which is a film of polyimide in this example embodiment.

In other alternative embodiments, the backing film 1 may be a film of any other suitable film material, such as a polyamide, polyphenylenesulfide, or polyetherketone film. As further alternatives, the backing film 1 can be a fiberglass fleece impregnated with a phenolic resin, or even a cast synthetic plastic film such as a polyamideimide film.

A measuring resistor grid 2 including a meandering or serpentine-shaped resistor strip 3 and electrical contacts 4 and 5 is formed or applied onto the backing film 1. The electrical contacts 4 and 5 are to be connected to an evaluating circuit, for example a Wheatstone bridge circuit. The resistor grids 2 are formed, for example, from a thin metallic layer such as a Constantan layer or a thin semiconductor material layer, that has been formed into the required meandering or serpentine shape by any known method, such as etching. The resistor grid 2 is applied and adhered onto the backing film 1, for example, by an adhesive layer 1' that may be a separate film of an adhesive material or an adhesive provided on the backing film 1.

1) phenolicresin impregnated fiberglass fleece

A cover 16 is applied over or arranged on the measuring resistor grid 2. The cover 16 comprises a first layer 6 of an insulating material and a second layer 7 in the form of a diffusion inhibiting metallic foil 7. The insulating material of the first layer 6 is, for example, 1) or 2)

The metallic foil 7 is, for example a foil of CrNi, CuNi, Au, or Al. It should be understood that the metallic layer 7 can be made of any metal or metal alloy that can be formed into a smooth, pore-free foil, and especially those materials that are particularly corrosion resistant. In the present example embodiment, the metal foil 7 has a thickness of about 5 μm, but the thickness can be within the range from 1 μm to 20 μm according to the invention.

2) a film of polyetherketone with adhesive, applied on both sides

The cover 16 can be applied to cover only the area of the meandering or serpentine resistor strip 3 of the resistor grid 2 as shown by dashed lines in FIG. 1. In this manner, the electrical contacts 4 and 5 are left exposed to allow the electrical connections to be made at a later time.

Figure 5:
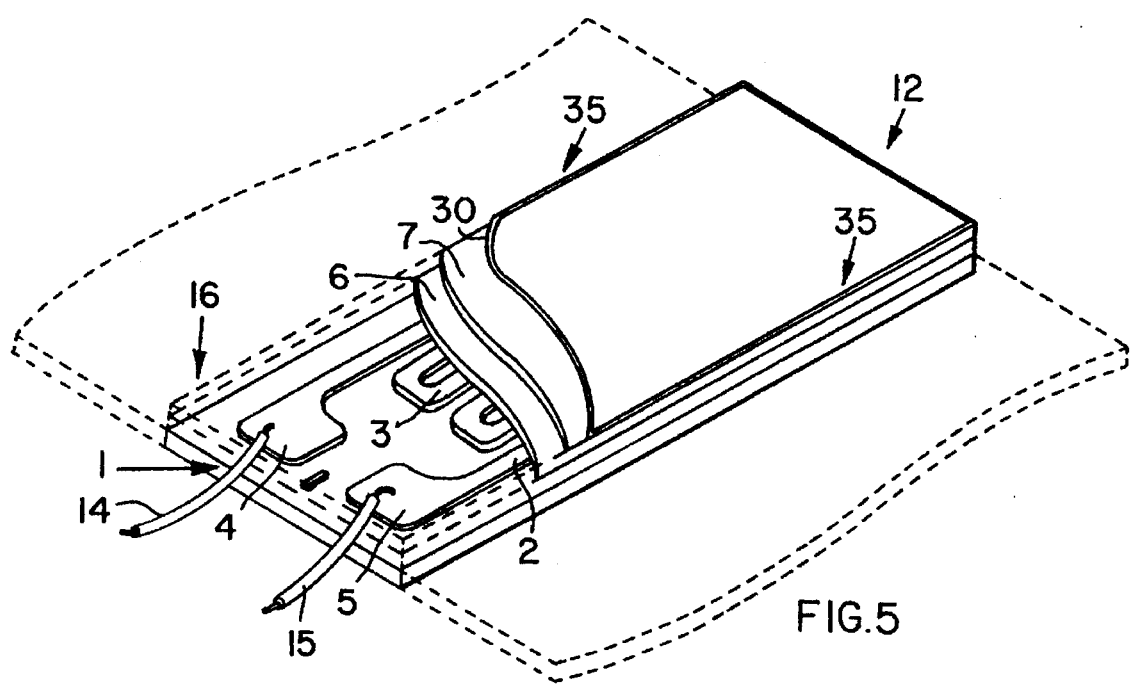
FIG. 5 is a perspective view of an embodiment of the strain gage of the invention having a cover applied over the entire surface area of a backing film.

Alternatively, as shown in FIG. 5, the cover 16 can be applied to cover substantially the entire upper surface of the strain gage 12. In this case, electrical conductor wires 14 and 15 are attached to the electrical contacts 4 and 5 before the cover 16 is applied. In this manner, the conductor wires 14 and 15 are sealed between the cover 16 and the backing film 1. The cover 16 has approximately the same area size as the backing film 1 in the finished strain gage 12 of FIG. 5.

As further shown in FIG. 5, an outer protective layer 30 can be applied over the metallic foil 7, to protect the metallic foil 7 from mechanical damage such as scratches and abrasions. The protective layer may be a layer or film of polyimide or polyurethane, for example.

In one embodiment of the method of making the strain gages according to the invention, the gages are manufactured by a continuous strip process, as represented in FIG. 1. In such a process, a plurality of measuring resistor grids 2 are formed in a generally known manner, next to one another along the lengthwise direction of a band-shaped strip 1A of the backing film, shown by dashed lines in FIG. 1. Next, the insulating layer 6, preferably in the form of a band- or strip-shaped insulating adhesive film or an insulating film that has adhesive applied on both sides thereof, is applied onto the resistor grids and backing film 1A in such a manner that the electrical contacts 4 and 5 of each measuring resistor grid 2 remain exposed. Alternatively, a separate adhesive film 6' can be applied between the insulating layer 6 and the resistor grids 2 applied on the backing film 1, and a separate adhesive film 6 can be applied between the insulating layer 6 and the metal foil 7. Next, the metal foil 7 is applied onto the insulating film 6, and the entire layered structure is laminated together tightly under the effects of pressure and temperature.

The resulting composite laminated strip or band is cut across its lengthwise extension to form the separate individual strain gages. Thus, in each finished strain gage, at least the metallic second layer 7 of the cover 16 and the backing film 1 have two cut-off edges 35 that are each formed by a respective common cut-off plane, as shown in FIG. 5. In other words, a single cutting operation cut through the second layer 7 and the backing film 1 to form each common cut edge 35. This ensures, by simple means, that the cut edges of the respective layers of each finished strain gage will be perfectly aligned in common cut-off planes. This also simplifies the total manufacturing procedure by eliminating the need for size matching and alignment steps, and by reducing the total number of cutting and laminating operations.

Various markings, such as orientation marks 20 and identifying trademarks and the like can be printed or otherwise marked onto the cover 16 as shown in FIG. 1. Such markings are preferably applied before the individual strain gages are cut from the continuous strip to avoid additional alignment steps.

Furthermore, an adhesive layer 1" can be applied onto the back surface of the backing film 1, i.e. the surface facing away from the resistor grid 2 and cover 16. The adhesive 1" is preferably applied onto the back surface of the backing film 1 before the continuous strip 1A is cut apart to form the individual, separate strain gages. The adhesive layer 1" is an activatable adhesive for mounting one or more of the strain gages 12 on a transducer member 25 or on a component of which the strain is to be measured, as shown in FIG. 3.

Figure 4:
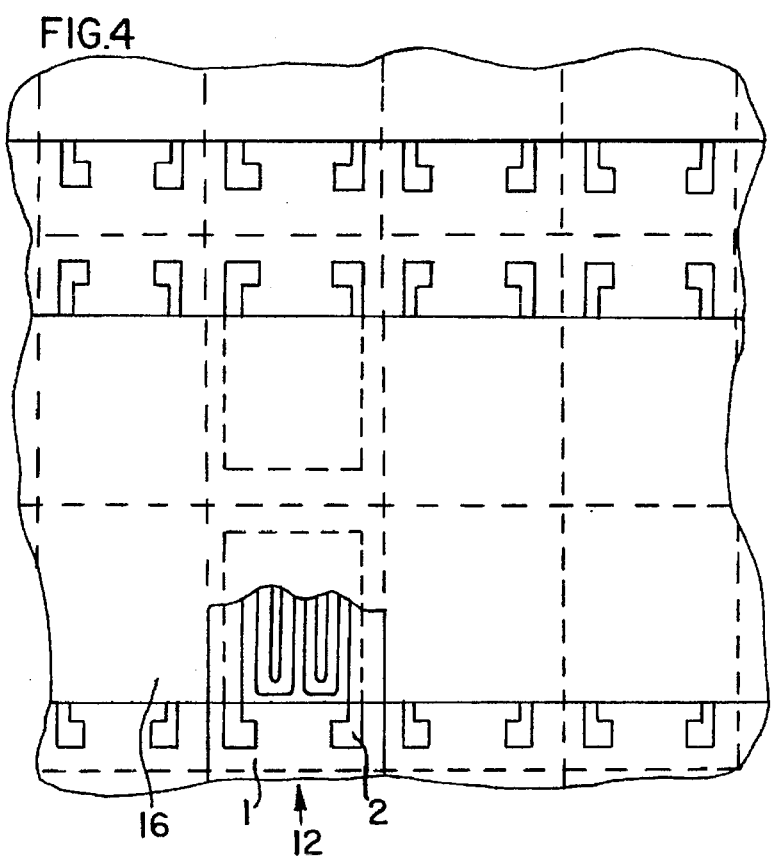
FIG. 4 is a schematic plan view representing the fabrication of a plurality of strain gages in a sheet form.

FIG. 4 schematically represents a second embodiment of a method of manufacturing the present strain gages. A plurality of strain gages can be formed in rows and columns across the surface of a large area sheet of the backing film 1. In such a method, layers of the strain gages can be formed as a corresponding large area sheet of a film or foil of the appropriate material. Thus, a sheet or foil of metal can be applied onto a sheet of the backing film 1 to form the measuring resistor grids 2. Next, a cover band or strip 16 including a band or strip of an insulating film 6 and a band or strip of a metallic foil 7 can be applied over the backing film 1 with the resistor grids 2 thereon. All of the layers are laminated together, and then the individual strain gages 12 are cut from the sheet.

Alternatively, the sheet of backing film 1 with the resistor grids 2 applied thereon can be cut into strips corresponding to the rows of resistor grids before the cover 16 is applied. Then, the cover 16 in the form of strips of an insulating film 6 and a metallic foil 7 is applied onto the strips of backing film 1 with resistor grids 2 thereon. Finally, the fabricated strips are cut or separated to form individual strain gages 12.

FIG. 2 is a graph representing the zero signal stability of the strain gages according to the invention in an atmosphere having a varying relative humidity. During the course of an experiment conducted at a temperature of 23° C. for a total time of 196 hours, the relative humidity of the atmosphere was varied to be 15%, 93%, 15%, 93%, and finally 50% for prescribed time periods shown by dashed vertical lines in the graph. As the relative humidity was varied as described above, the null or zero signal of two groups of strain gages was measured.

Group A of zero signal traces shows the zero signal variations of a group of 4 comparative sample strain gages having a backing material and a cover material both comprising a fiberglass fleece impregnated with a phenolic resin. Group B of zero signal traces corresponds to a group of 8 strain gages according to the invention having a backing film comprising a phenolic resin impregnated fiberglass fleece and having a cover comprising a first layer of a phenolic resin impregnated fiberglass fleece and a second layer of a metallic foil. The shape and dimensions of the measuring resistor grid and the other features of the strain gages of group A and group B were otherwise the same.

As can be seen clearly in FIG. 2, the inventive strain gages in group B have a significantly improved resistance to changes in relative humidity and thereby achieve a very high stability of the zero signal even under drastically varying atmospheric conditions. The comparative example strain gages of group A show the characteristic variation in the zero signal corresponding to the variation of the relative humidity, as would be expected for strain gages that are not well protected against moisture penetration.

Although the invention has been described with reference to specific example embodiments, it will be appreciated that it is intended to cover all modifications and equivalents within the scope of the appended claims.

What is claimed is:

1. A strain gage comprising in order a backing film, a resistor grid, and a cover including an insulating first layer and a metallic foil second layer, wherein said second layer has dimensions in the plane of said cover that are smaller than or equal to corresponding dimensions of said backing film.

2. The strain gage of claim 1, wherein said dimensions of said second layer are smaller than said corresponding dimensions of said backing film.

3. The strain gage of claim 1, wherein said second layer and said backing film comprise at least two common cut-off edges that are each formed by a respective common cut-off plane.

4. The strain gage of claim 1, wherein said second layer has outer edges that are not hermetically sealed to said backing film.

5. The strain gage of claim 1, wherein said backing film comprises a material selected from the group consisting of polyimide, polyamide, polyphenylenesulfide, polyamide-imide and fiberglass reinforced resin.

6. The strain gage of claim 1, wherein said second layer comprises a material selected from the group consisting of CrNi, CuNi, Au and Al.

7. The strain gage of claim 1, further comprising an intermediate layer of an adhesive material between said first layer and said second layer.

8. The strain gage of claim 1, further comprising orientation marks provided on or in said second layer.

9. The strain gage of claim 1, further comprising a protective outer layer arranged on said second layer.

10. The strain gage of claim 1, further comprising an adhesive layer between said resistor grid and said first layer.

11. The strain gage of claim 1, wherein at least said first layer and said second layer together are provided by form a single composite film.

12. The strain gage of claim 11, wherein said backing film, said resistor grid, said first layer, and said second layer together form a composite film component.

13. The strain gage of claim 12, further comprising an activatable adhesive provided on an outer surface of said composite film component.

14. A measuring transducer comprising a strainable member and a plurality of strain gages mounted thereon, wherein each of said strain gages comprises in order a backing film, a resistor grid including electrical contacts, and a cover including an insulating first layer and a metallic foil second layer, wherein said second layer has dimensions in the plane of said cover that are smaller than or equal to corresponding dimensions of said backing film, and wherein said strain gages are selected from the group consisting of strain gages in which said cover extends over the entire area of said backing film except at said electrical contacts and strain gages in which said cover extends over only a portion of the area of said backing film except at said electrical contacts.

15. The measuring transducer of claim 14, wherein said metallic foil second layer of each of said strain gages has outer edges that are not hermetically sealed to said backing film and are not hermetically sealed to said strainable member.

16. The strain gage of claim 1, wherein said backing film is a film of an insulating material on which said resistor grid has been directly formed.

17. A method of manufacturing the strain gage of claim 1, comprising:

a) providing a backing film;

b) arranging at least one resistor grid on said backing film;

c) arranging an insulating first cover layer on said at least one resistor grid and at least a portion of said backing film;

d) arranging a metallic foil second cover layer on said first cover layer; and e) cutting through a resulting stacked arrangement of said backing film, said at least one resistor grid, said first cover layer and said second cover layer at at least one cutting plane offset from said at least one resistor grid to form at least one of said strain gages.

18. The method of claim 17, wherein said backing film, said first cover layer and said second cover layer are in the form of strips, and wherein said step b) comprises arranging at least a single row of said at least one resistor grid along said strip of said backing film.

19. The method of claim 17, wherein at least said backing film is in the form of a sheet, and wherein said step b) comprises arranging an array of said at least one resistor grid in rows and columns on said sheet of said backing film.

20. The method of claim 17, wherein said first cover layer and said second cover layer together form a composite cover film.

21. The method of claim 17, further comprising arranging a respective adhesive layer at at least one intermediate position selected from positions between said at least one resistor grid and said first cover layer and between said first cover layer and said second cover layer.

22. The method of claim 21, wherein said adhesive layer and said first cover layer are each in the form of a respective film.

* * * * *

UNITED STATES PATENT AND TRADEMARK OFFICE
CERTIFICATE OF CORRECTION

PATENT NO. : 5,631,622

DATED : May 20, 1997

INVENTOR(S) : Hauber et al.

It is certified that error appears in the above-identified patent and that said Letters Patent is hereby corrected as shown below.

On the cover page, please add in [56] References Cited under
U. S. PATENT DOCUMENTS: --4,050,976   9/1977   Reiters--;
under FOREIGN PATENT DOCUMENTS enter:
        --59-231430   12/1984   Japan
          0107966   5/1984   Europe--;
under OTHER PUBLICATIONS enter:
    --Wagen + Dosieren, May 93, Selbstklebende
      Dehnungsmesssstreifen, pages 38, 39;

Mesures, June 1989, Extensometrie Haute Temperature-
    Choisissez D'abord, Compensez Apres, pages 69,70,72.--

Column 6, line 20, please delete the entire line,
    line 25, replace "1) or 2)" by
        --1) phenolic resin impregnated fiberglass
          fleece or 2) a film of polyetherketone with
          adhesive, applied to both sides.--;
    lines 34 and 35, please delete the entire lines.

UNITED STATES PATENT AND TRADEMARK OFFICE
CERTIFICATE OF CORRECTION

PATENT NO. : 5,631,622
DATED : May 20, 1997
INVENTOR(S) : Hauber et al.

It is certified that error appears in the above-identified patent and that said Letters Patent is hereby corrected as shown below.

Column 6, line 65, replace "grids" by --grids 2--;
Column 7, line 2 , replace "film 6" by --film 6'--;
Column 8, line 60, delete "form".

Signed and Sealed this

Twenty-seventh Day of January, 1998

Attest:

BRUCE LEHMAN

Attesting Officer

Commissioner of Patents and Trademarks